United States Patent [19]

Mogamiya

[11] Patent Number: 5,790,190
[45] Date of Patent: Aug. 4, 1998

[54] ELECTRONIC DEVELOPMENT TYPE IMAGE PICKUP DEVICE

[75] Inventor: Makoto Mogamiya, Tokyo, Japan

[73] Assignee: Asahi Kogaku Kogyo Kabushiki Kaisha, Tokyo, Japan

[21] Appl. No.: 622,678

[22] Filed: Mar. 26, 1996

[30] Foreign Application Priority Data

Mar. 27, 1995 [JP] Japan .................................. 7-093139
Mar. 27, 1995 [JP] Japan .................................. 7-093140

[51] Int. Cl.$^6$ .................................. H04N 5/225
[52] U.S. Cl. .................. 348/263; 348/350; 396/429; 358/906
[58] Field of Search .................. 348/262, 263, 348/265, 207, 345, 350; 347/245; 346/44; 399/4, 152; 396/429; 358/906

[56] References Cited

U.S. PATENT DOCUMENTS

| | | |
|---|---|---|
| 4,552,445 | 11/1985 | Mukai et al. . |
| 4,647,979 | 3/1987 | Urata ............................ 348/350 |
| 4,652,931 | 3/1987 | Okudaira et al. ................ 348/350 |
| 4,709,260 | 11/1987 | Geerts et al. ................... 348/263 |
| 5,150,957 | 9/1992 | Walker et al. ................... 348/263 |
| 5,294,990 | 3/1994 | Aoki et al. . |
| 5,424,156 | 6/1995 | Aoki et al. . |
| 5,628,920 | 5/1997 | Sakano et al. .................. 399/152 |
| 5,678,101 | 10/1997 | Mogamiya et al. .............. 396/429 |

FOREIGN PATENT DOCUMENTS

| | | |
|---|---|---|
| 0327236 | 8/1989 | European Pat. Off. . |
| 60-41013 | 3/1985 | Japan . |
| 2-29081 | 1/1990 | Japan . |
| 3296014 | 12/1991 | Japan . |
| 5-2280 | 1/1993 | Japan . |

*Primary Examiner*—Wendy Garber
*Attorney, Agent, or Firm*—Greenblum & Bernstein P.L.C.

[57] ABSTRACT

An electronic development type image pickup device includes an optical color separation system which separates an object image formed by a photographing optical system into different color light components and converges the latter onto respective image forming surfaces. An electronic development type recording medium is provided having a plurality of recording areas provided on the respective image forming surfaces to electronically develop the images formed therein and thereby record the developed images as optical images. An output device outputs a plurality of beams of light to the optical color separation system to be made incident upon the recording areas at positions outside of the optical images formed therein to form reference marks.

12 Claims, 6 Drawing Sheets

1

ELECTRONIC DEVELOPMENT TYPE IMAGE PICKUP DEVICE

BACKGROUND OF THE INVENTION

1. Field of the Invention

The present invention relates to an image pickup device using an electronic development type recording medium, in which an image of an object to be photographed is electronically developed upon photographing.

2. Description of Related Art

In the past, an electronic development type recording medium has been used as a photographing material, in which an optical image (object image) formed by a photographing lens (photographing optical system) is electronically developed upon photographing. For example, Japanese Unexamined Patent Publication No. 5-2280 discloses a recording medium comprised of a combination of an electrostatic data recording medium and an electric charge holding medium. Note that in this specification, the recording medium of this kind will be referred to as an electronic development type recording medium, and an image pickup device using the electronic development type recording medium will be referred to as an electronic development type image pickup device.

In Japanese Unexamined Patent Publication No. '280 mentioned above, the electrostatic data recording medium is made of a photoconductive layer and an inorganic oxide layer, and the electric charge holding medium is made of a liquid crystal display (LCD) element. When the electrostatic data recording medium is exposed during an application of a voltage to the electrostatic data recording medium and the electric charge holding medium, electric charges corresponding to the amount of light incident upon the electrostatic data recording medium are produced therein. The intensity of the electric field acting upon the LCD element, opposed to the electrostatic data recording medium, varies depending on the amount of electric charge, and thus, an image corresponding to a distribution of the amount of light is displayed, i.e., developed in the LCD element.

In an application of the electronic development type recording medium to a color image pickup device, light transmitted through a photographing optical system, when a picture of an object is being taken, is made incident upon an optical color separation system where color light components of red (R), green (G), and blue (B) are separated. The optical images corresponding to the respective color components are recorded on respective recording mediums. Thereafter, the recorded images are read and combined to obtain a reproduced color image corresponding to the object image.

In the color image pickup device, as mentioned above, a plurality of (usually three) separated color image components must be precisely aligned and combined. To this end, it is necessary to precisely position the recording unit and precisely assemble the optical color separation system.

Furthermore, in the color image pickup device using the electronic development type recording medium, an AF optical system is preferably incorporated, as in other image pickup devices. In conventional single lens reflex cameras, the AF optical system is provided in a light path of an auxiliary mirror provided on a movable mirror (movable reflector) which is moved to selectively make the photographing light incident upon a view finder or an image forming surface. However, in this color image pickup device, it is necessary to provide a complex drive mechanism in order to move the movable mirror. Moreover, since the optical color separation system is provided behind the movable mirror, the photographing optical system has a long back focal distance.

SUMMARY OF THE INVENTION

A primary object of the present invention is to provide an electronic development type image pickup device in which a plurality of color image components photographed and separated by an optical color separation system can be precisely and easily aligned and combined, regardless of the precision in positioning of the recording unit and assembly of the optical color separation system.

Another object of the present invention is to provide an electronic development type image pickup device in which an AF optical system can be incorporated without need for a movable mechanism and without increasing the back focal distance (between a photographing optical system and a recording medium).

According to a first aspect of the present invention, marks or indicia are recorded in advance on a plurality of separated color image components before the images are taken, so that the separated color image components can be easily and precisely aligned.

To realize this, according to an aspect of the present invention, there is provided an electronic development type image pickup device comprising a photographing optical system which forms an object image. An optical color separation system separates the object image formed by the photographing optical system into different color light components and converges the color light components onto respective image forming surfaces. An electronic development type recording medium is provided having a plurality of recording areas provided on the respective image forming surfaces to electronically develop the images formed therein to thereby record the developed images as optical images. A beam generator outputs a plurality of beams of light to the optical color separation system. A beam spot forming optical system forms at least two marks on each recording area, at different positions, by the beams of light (generated by the beam generator and made incident upon the recording areas). The marks of each recording area are used as reference points to align the plurality of recording areas.

Preferably, the two marks are formed outside of the optical images formed on each recording area.

A holding mechanism is also preferably provided, for holding the electronic development type recording medium so that the recording areas lie in the same plane.

The electronic development type image pickup device preferably further comprises a reflector provided between the beam generator and the optical color separation system to make the beams of light emitted from the beam generator incident upon the optical color separation system. The reflector is movable to retract from an optical axis of the photographing optical system upon a photographing operation. The reflector can be adapted to make the object image incident upon a view finder when the reflector makes the beams of light emitted from the beam generator incident upon the optical color separation system.

According to another aspect of the present invention, an electronic development type image pickup device comprises a photographing optical system which forms an object image on a first image forming plane. An electronic development type recording medium is provided at the first image forming plane to electronically develop the image formed therein, the electronic development type recording medium being light permeable. An image reforming optical system reforms the image formed on the electronic development type recording medium into a pair of images onto a second image forming plane. An AF sensor is also provided, at the second image forming plane, to detect a focus state of the image formed on the electronic development type recording medium.

Preferably, the image reforming optical system and the AF sensor are provided behind the electronic development type recording medium, and the image reforming optical system comprises a condenser lens and a pair of separator lenses.

The electronic development type image pickup device preferably further comprises an optical color separation system which separates the light emitted from the photographing optical system into different color light components and converges the color light components onto the first image forming plane. The electronic development type recording medium is provided with a plurality of recording areas located on the first image forming plane.

According to another aspect of the present invention an electronic development type image pickup device is provided comprising a photographing optical system which forms an object image. An optical color separation system separates the object image formed by the photographing optical system into different color light components and converges the color light components onto respective image forming surfaces. An electronic development type recording medium is provided having a plurality of recording areas, provided on the corresponding image forming surfaces, to electronically develop the images formed therein to thereby record the developed images as optical images. A beam spot forming optical system is provided for forming at least two marks on each recording area at different positions thereon before recording the images onto each recording area. The marks of each recording area are reference points to align the plurality of recording areas.

According to a further aspect of the present invention an electronic development type image pickup device is provided comprising a photographing optical system which forms an object image on an image forming surface. An electronic development type recording medium is provided on the image forming surface to electronically develop the image formed therein. The electronic development type recording medium is light permeable. An AF optical system is provided behind the electronic development type recording medium to detect a focus state of the image formed on the recording medium using light passed through the recording medium.

The present disclosure relates to subject matter contained in Japanese Patent Application No. 7-93139 (filed on Mar. 27, 1995) and Japanese Patent Application No. 7-93140 (filed on Mar. 27, 1995) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
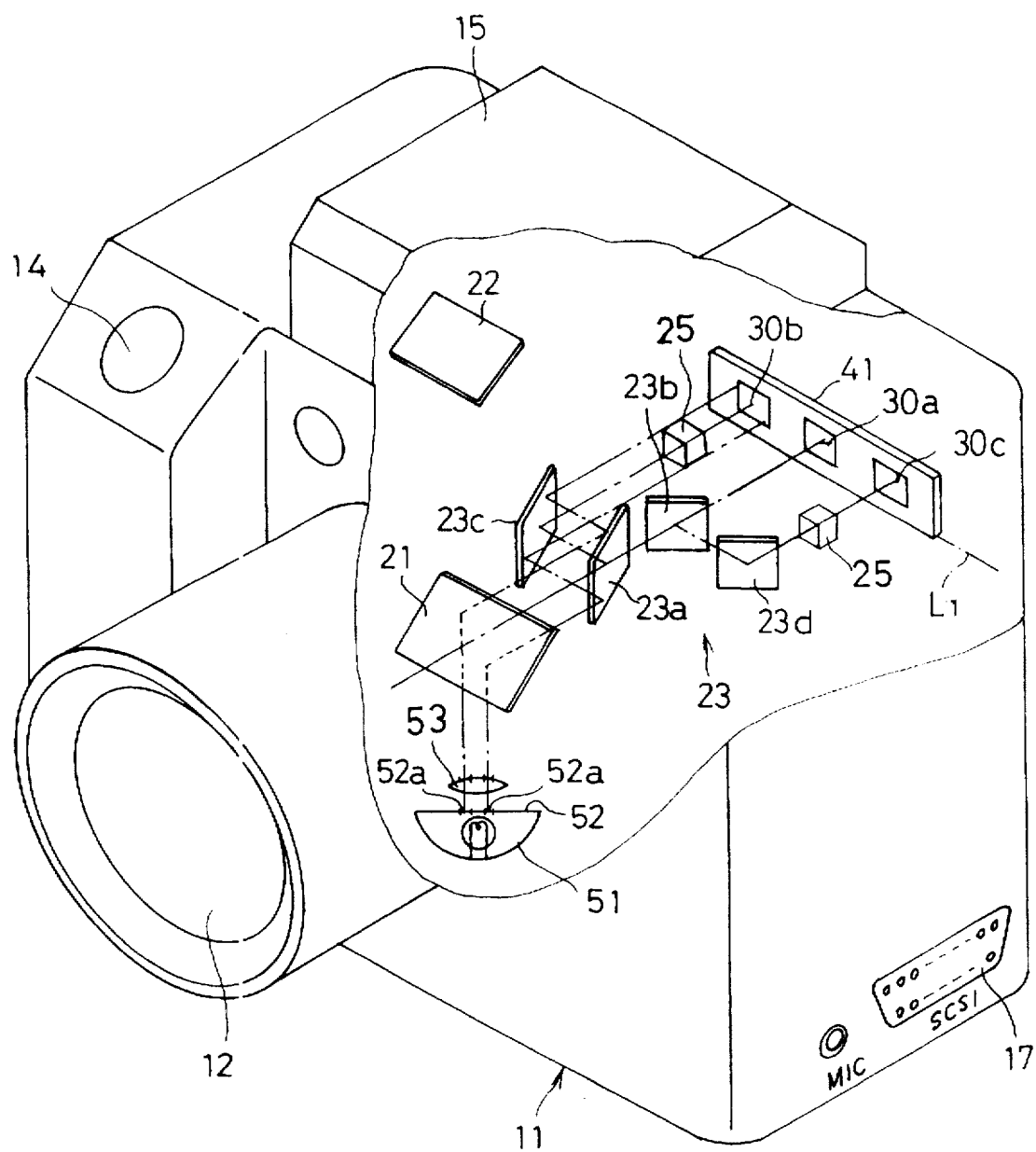
FIG. 1 is a partially broken perspective view of a still video camera according to a first aspect of the present invention.
Figure 2:
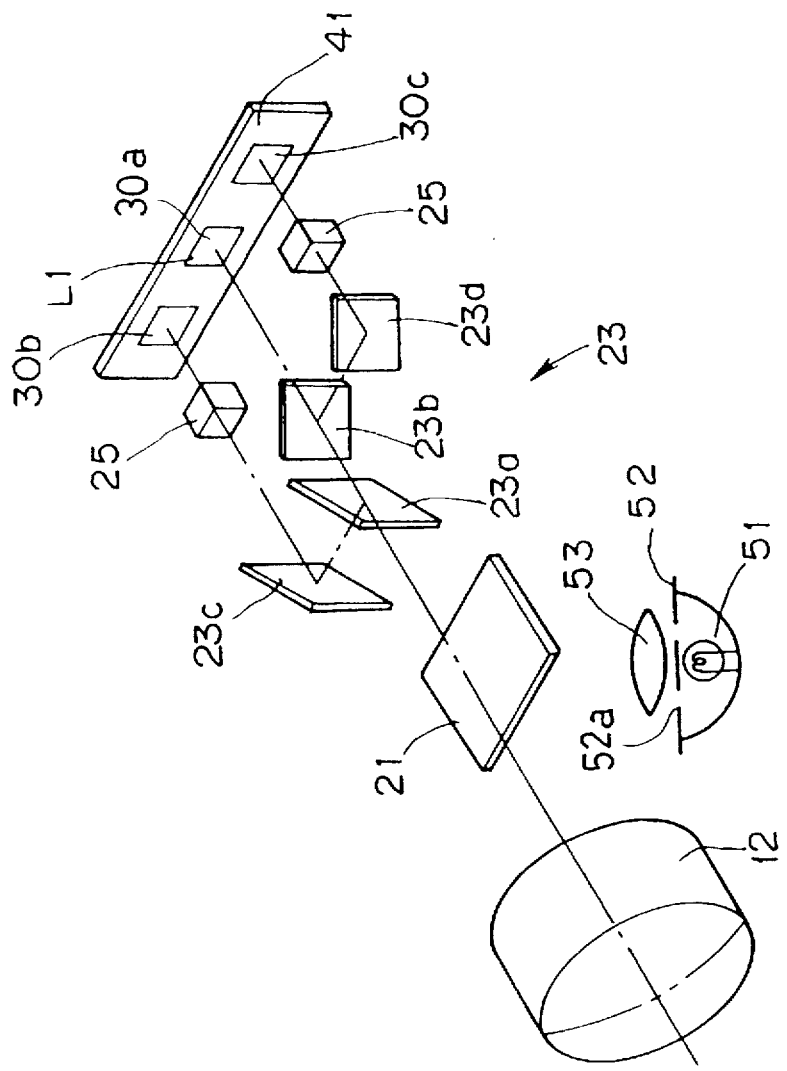
FIG. 2 is a perspective view of optical elements in the still video camera shown in FIG. 1.
Figure 3:
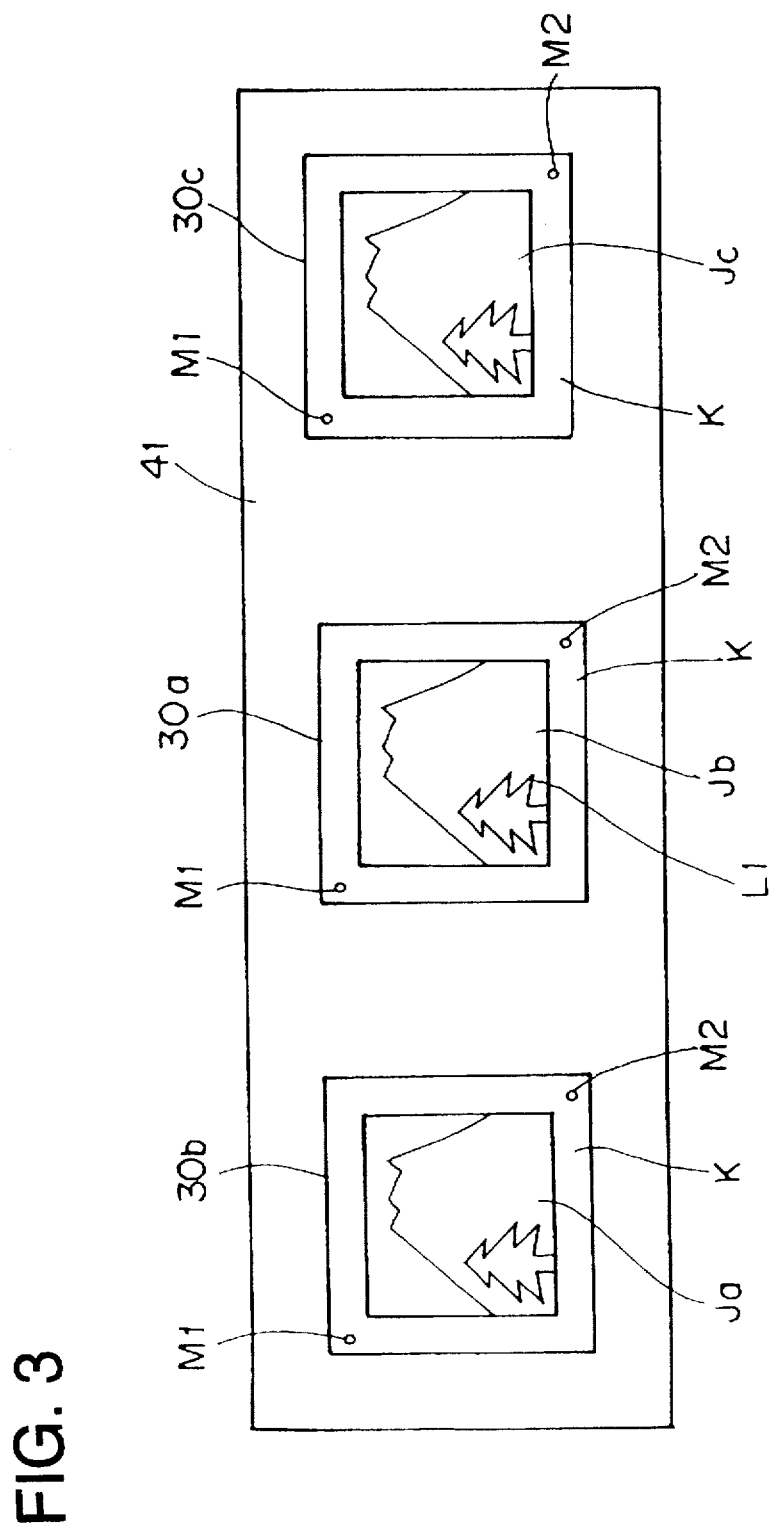
FIG. 3 is a front elevational view of a recording unit of the still video camera shown in FIG. 1.

FIGS. 1 through 3 show a first embodiment of the present invention, applied to a still video camera. The still video camera is an electronic development type image pickup device in which an object image is developed in an electronic development type recording medium.

As viewed in FIG. 1, a still video camera 10 comprises a photographing optical system 12, located at substantially a central portion of a camera body 11, to converge an image (taken picture image) onto an image forming plane (surface) L1. The photographing optical system 12 comprises a plurality of photographing lens groups, including a focusing lens group (not shown). The focusing lens group is moved along an optical axis of the photographing optical system 12 to establish a predetermined focus position during an automatic focusing (AF) operation. The control of the photographing lens groups is per se known and hence is not discussed herein.

A release switch 14 is provided on an upper left portion of the camera body 11 (as viewed in FIG. 1) with respect to the photographing optical system 12. When the release switch 14 is depressed by a half step, a photometering operation and an AF operation are effected. When the release switch 14 is fully depressed, a photographing operation is effected.

The camera body 11 is provided with a strobe device (not shown) at an upper portion thereof, and a view finder system 15 at a center portion of an upper surface of the camera body 11.

Image signals obtained by the camera 10 are sent to an external recording apparatus through an output terminal 17 provided at a lower portion of a side surface of the camera body 11.

Figure 4:
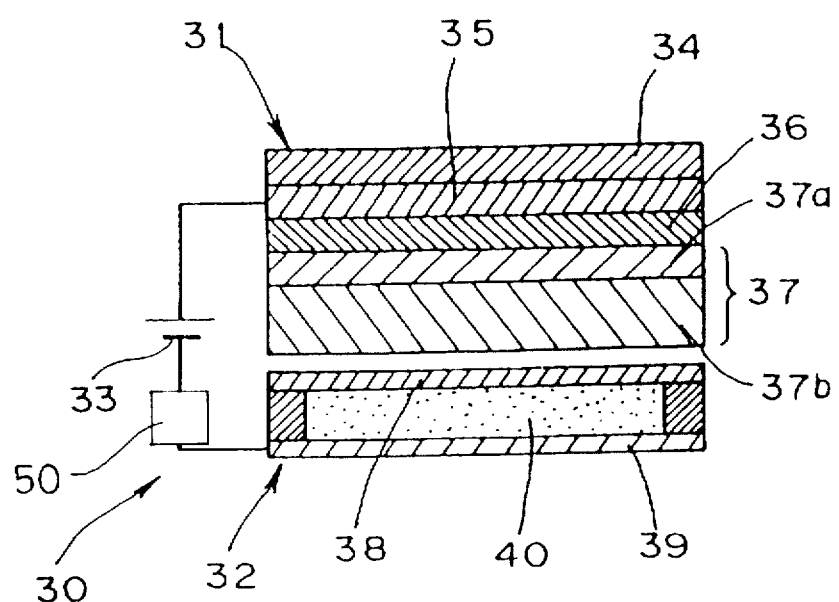
FIG. 4 is a sectional view of an electronic development type recording medium, by way of example.

A recording unit 41 is provided behind the photographing optical system 12 to hold an electronic development type recording medium 30 (FIG. 4). The electronic development type recording medium 30 has recording areas 30a, 30b and 30c provided in the image forming plane L1. When the recording areas 30a, 30b and 30c are exposed during an application of a voltage thereto, images formed by the photographing optical system 12 are developed as visible images.

The camera body 11 is provided on a side surface thereof with a recording unit insertion slit (not shown) through which the recording unit 41 is inserted into and ejected from the camera body 11. When the recording unit 41 is inserted in the camera body 11, an insertion detecting member (not shown) provided in the camera body 11 is depressed by the recording unit 41, so that a control circuit (not shown) in the camera body 11 detects the insertion of the recording unit 41. A pre-marking operation, which will be discussed hereinafter, can be carried out upon detection of the insertion of the recording unit 41.

An optical color separation system 23 is provided between the photographing optical system 12 and the electronic development type recording medium 30. The optical color separation system 23 comprises an R-reflection dichroic mirror 23a which reflects a red light component and is permeable to (i.e. transmits) blue and green light components, a B-reflection dichroic mirror 23b which reflects a blue light component and is permeable to a green light component, and two total reflection mirrors 23c and 23d.

The R-reflection dichroic mirror 23a is located on the optical axis of the photographing optical system 12 and is inclined at a predetermined angle with respect to the optical axis. The B-reflection dichroic mirror 23b is located in the light path of the light transmitted through the R-reflection dichroic mirror 23a and is inclined at a predetermined angle with respect to the optical axis in a direction opposite to the inclination direction of the R-reflection dichroic mirror 23a. The total reflection mirrors 23c and 23d are opposed to and in parallel with the reflection surfaces of the R-reflection dichroic mirror 23a and the B-reflection dichroic mirror 23b, respectively, so that beams of light reflected by the reflection surfaces of the R-reflection dichroic mirror 23a and the B-reflection dichroic mirror 23b are made incident upon the respective total reflection mirrors 23c and 23d. The total reflection mirrors 23c and 23d reflect the beams of light incident thereupon toward the recording areas 30b and 30c, respectively.

Optical path length correcting prisms 25, of an optical correction system, are provided between the total-reflection mirror 23c and the recording area 30b and the total-reflection mirror 23d and the recording area 30c, respectively. The green light component is transmitted through the R-reflection dichroic mirror 23a and the B-reflection dichroic mirror 23b and is converged onto the recording area 30a which lies on the image forming plane (surface) L1. On the other hand, the optical path lengths of the red light component and the blue light component are corrected (lengthened) by the respective optical path length correcting prism 25, so that the red and blue light components are converged onto the recording areas 30b and 30c which lie on the image forming plane (surface) L1.

A movable reflector (rotatable reflector) 21 is provided between the photographing optical system 12 and the optical color separation system 23. The movable reflector 21 is provided on front and rear surfaces thereof with total reflection surfaces. The movable reflector 21 is normally located in an oblique position (object viewing position) in which the movable reflector 21 is inclined with respect to the optical axis of the photographing optical system 12. When the movable reflector 21 is in the oblique position, light is reflected by the front total reflection surface thereof toward a total reflection mirror 22 of the view finder system 15. When the movable reflector 21 is moved to a horizontal position (retracted position) shown in FIG. 2, it is retracted from the optical axis of the photographing optical system 12, so that the light transmitted through the photographing optical system 12 can be entirely received by the optical color separation system 23.

A light source 51, e.g., a laser source, is provided below the movable reflector 21. A pin-hole plate 52, having two pin-holes 52a, is provided in front of the light source 51. A collimating lens 53 is provided in front of the light source 51 and the pin-hole plate 52. The light emitted from the light source 51 passes through the pin-holes 52a of the pin-hole plate 52 and is collimated by the collimating lens 53. The two parallel beams thus obtained are made incident upon the rear total reflection surface of the movable reflector 21.

FIG. 3 shows a front elevational view of the recording unit 41. As mentioned previously, the recording unit 41 includes three rectangular recording areas 30a, 30b and 30c of the electronic development type recording medium 30 that are spaced at a substantially equi-distance in the longitudinal direction of the recording unit 41. Object images are respectively recorded in the recording areas 30a, 30b and 30c as a green light component optical image Ja, a red light component optical image Jb, and a blue light component optical image Jc.

Blank portions K surround each recording area 30a, 30b and 30c. Indicia (marks) M1, M2 are respectively recorded in the blank portion K on upper and lower edges of each recording area 30a, 30b and 30c. The indicia M1, M2 in each recording area are substantially diametrically opposed. The indicia M1, M2 are recorded when the movable reflector 21 is in the oblique position, the light source 51 is actuated and the recording unit 41 is brought into a recordable state.

In the illustrated embodiment, although the three recording areas 30a, 30b and 30c are constituted by three electronic development type recording mediums, it is possible to provide a plurality of recording areas in the same electronic development type recording medium, in which the recording areas are separated by a predetermined shape of mask.

FIG. 4 shows an internal structure of a recording area of the electronic development type recording medium 30 by way of example. The arrangement shown in FIG. 4 is the same as that disclosed in the above mentioned Japanese Unexamined Patent Publication No. '280.

The electronic development type recording medium 30 comprises an electrostatic data recording medium 31 and an electric charge holding medium 32. The electrostatic data recording medium 31 and the electric charge holding medium 32 are connected to an electrical power source 33. The electrostatic data recording medium 31 is made of a laminated structure comprising a substrate 34, an electrode layer 35, an inorganic oxide layer 36, and a photoconductive layer 37. The photoconductive layer 37 comprises an electric charge producing layer 37a and an electric charge carrying layer 37b laminated thereon. The electric charge holding medium 32 comprises a liquid crystal (LC) 40 enclosed between a liquid crystal support 38 and a liquid crystal electrode layer 39. The electric charge carrying layer 37b of the electrostatic data recording medium 31 is opposed to the LC support 38 of the electric charge holding medium 32 with a slight gap therebetween.

The electrical power source 33 is provided in the camera body 11 so that power can be supplied to the electronic development type recording medium 30 when the recording unit 41 is loaded in the camera body 11.

A recording medium drive circuit 50 is provided in the camera body 11 to control the voltage of the power source 33 to be applied to the recording medium 30. When the electrostatic data recording medium 31 is exposed during the application of the voltage to the electrode layer 35 and the LC electrode layer 39, i.e., to the electrostatic data recording medium 31 and the charge holding medium 32, electric charges corresponding to the image are produced in the electrostatic data recording medium 31. Since the field intensity acting on the liquid crystal 40 varies in accordance with the amount of electric charge, the image is displayed in the liquid crystal 40 as a visible image. Thus, an object image is developed. The electric charge holding medium 32 comprises a dispersion type LCD element, and hence the developed visible image can be held even after the electric field is removed. The developed visible image can be erased by heating the dispersion type LCD element to a predetermined temperature using a heater (not shown). The erasure of the developed visible image makes it possible to repeatedly use the same recording medium.

The operation of the movable reflector 21, the electronic development type recording medium 30, and the light source 51 is controlled in accordance with the operation of the release switch 14 or the insertion of the recording unit 41, etc., by a control circuit (not shown). The apparatus of the present invention operates as follows.

When no picture is being taken, the movable reflector 21 is positioned in the oblique position (FIG. 1), and the light source 51 is turned OFF. In this state, if the recording unit 41 is inserted in the insertion slot of the camera body 11 prior to the photographing operation, the correct insertion of the recording unit 41 is detected by the insertion detecting member (not shown). Consequently, the voltage of the power source 33 is applied to the electronic development type recording medium 30, and the the light source 51 is turned ON concurrently. Consequently, the two beams emitted through the pin-holes 52a of the pin-hole plate 52 are collimated by the collimating lens 53 and are then made incident upon the movable reflector 21. The beams are then reflected by the rear total reflection surface of the movable reflector 21 toward the R-reflection dichroic mirror 23a of the optical color separation system 23.

The green light component is transmitted through the R-reflection dichroic mirror 23a and the B-reflection dichroic mirror 23b, and is made incident upon the blank portion K of the center recording area 30a of the recording unit 41. The red light component is reflected by the R-reflection dichroic mirror 23a and the total reflection mirror 23c and is made incident upon the blank portion K of the recording area 30b through the optical path length correcting prism 25. Also, the blue light component is reflected by the B-reflection dichroic mirror 23b and the total reflection mirror 23d and is made incident upon the blank portion K of the recording area 30c through the optical path length correcting prism 25. The three light components are made incident upon the blank portions K of the corresponding recording areas 30a, 30b and 30c to form the indicia (markings) M1 and M2 thereon. When the indicia M1 and M2 are formed, the application of the voltage of the power source 33 to the recording medium 30 is stopped, and the power source 51 is turned OFF.

Although in the above explanation the indicia M1 and M2 are formed when the recording unit 41 is inserted in the camera body 11, it is possible to provide a pre-marking switch on the camera body 11, so that when the pre-marking switch is actuated, the markings M1 and M2 are formed in the recording areas (blank portions).

When the release switch 14 is depressed a full step, the movable reflector 21 is moved from the oblique position (shown in FIG. 1) to the retracted position (horizontal position) shown in FIG. 2, in which the movable reflector 21 is retracted from the optical axis of the photographing optical system 12. Consequently, the light reflected from the object to be photographed is made incident upon the R-reflection dichroic mirror 23a through the photographing optical system 12 which has already been focused. Thus, the light is separated into three colors R (red), G (green), B (blue) by the optical color separation system 23 and is converged onto the recording areas 30a, 30b and 30c, respectively, similar to the formation of the indicia M1 and M2. The images thus formed on the recording areas are developed and recorded therein as optical images corresponding to the green, red and blue light components. The recording, i.e., the development, is carried out when the photographing light is incident upon the recording areas 30a, 30b and 30c during the application of the voltage from the power source 33 to the electronic development type recording medium 30. The exposure time is controlled by a shutter (not shown) or by control of the voltage application time in which the voltage is applied to the recording medium 30 by the recording medium drive circuit 50.

The size of the recording areas 30a, 30b and 30c can be set, for example, by inserting a mask whose size corresponds to the recording areas, in the photographing light path. The mask is provided with holes through which the beams for forming the indicia M1 and M2 can pass but the photographing beams can not pass, so that the indicia M1 and M2 can be formed on the blank portions K of each recording area.

Upon completion of the photographing operation, for example when images Ja, Jb, and Jc, recorded on the recording areas 30a, 30b and 30c, are read and combined (aligned), reference is made to the indicia M1 and M2 for each recorded image so as to precisely determine a relative position between the images. Thus, a high quality color image having a high resolution can be easily reproduced. The positioning of the images can be easily effected, for example, by an operator who registers the corresponding indicia M1 and M2 of the respective images.

As can be seen from the foregoing, in the illustrated embodiment, since each of the recording areas 30a, 30b and 30c of the recording medium 30 has two indicia M1 and M2 that are formed in advance before the photographing operation begins, the positions of the images can be easily and precisely aligned. Thus, a high quality color image having a high resolution can be easily reproduced regardless of an error in the insertion position of the recording unit 41 or an error in the manufacture of the recording areas 30a, 30b and 30c, etc. Moreover, since it is not necessary to produce the recording unit 41 with an extremely high precision, the recording unit 41 can be easily manufactured.

In other words, since it is not necessary to provide an image combining marking on the object to be taken upon photographing in the present invention, unlike the prior art, a high quality color image of high resolution can be obtained by a simple optical system.

Figure 5:
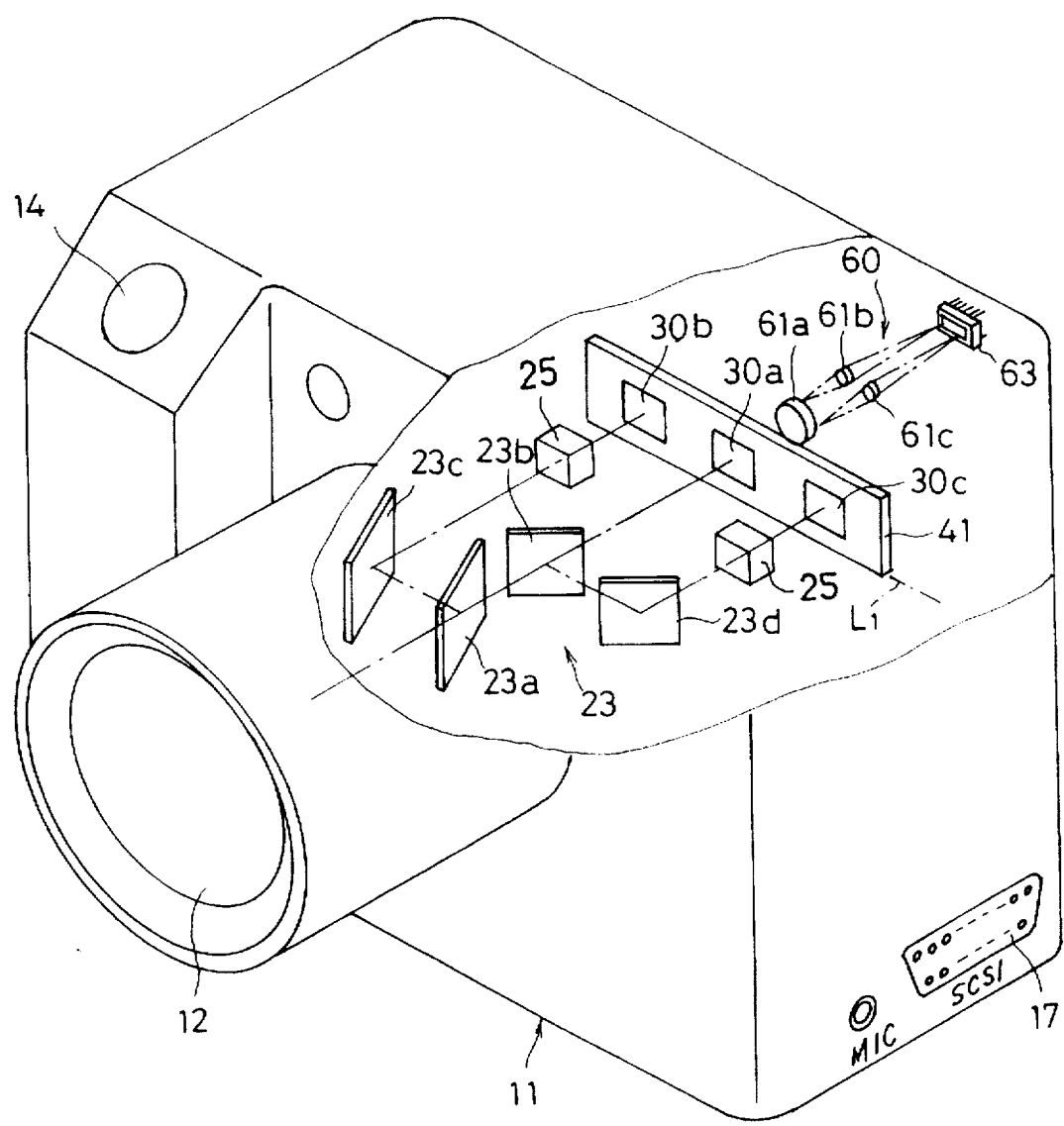
FIG. 5 is a partially broken perspective view of a still video camera according to a second aspect of the present invention; and, FIG. 6 is a schematic view of an AF optical system of the still video camera shown in FIG. 5.
Figure 6:
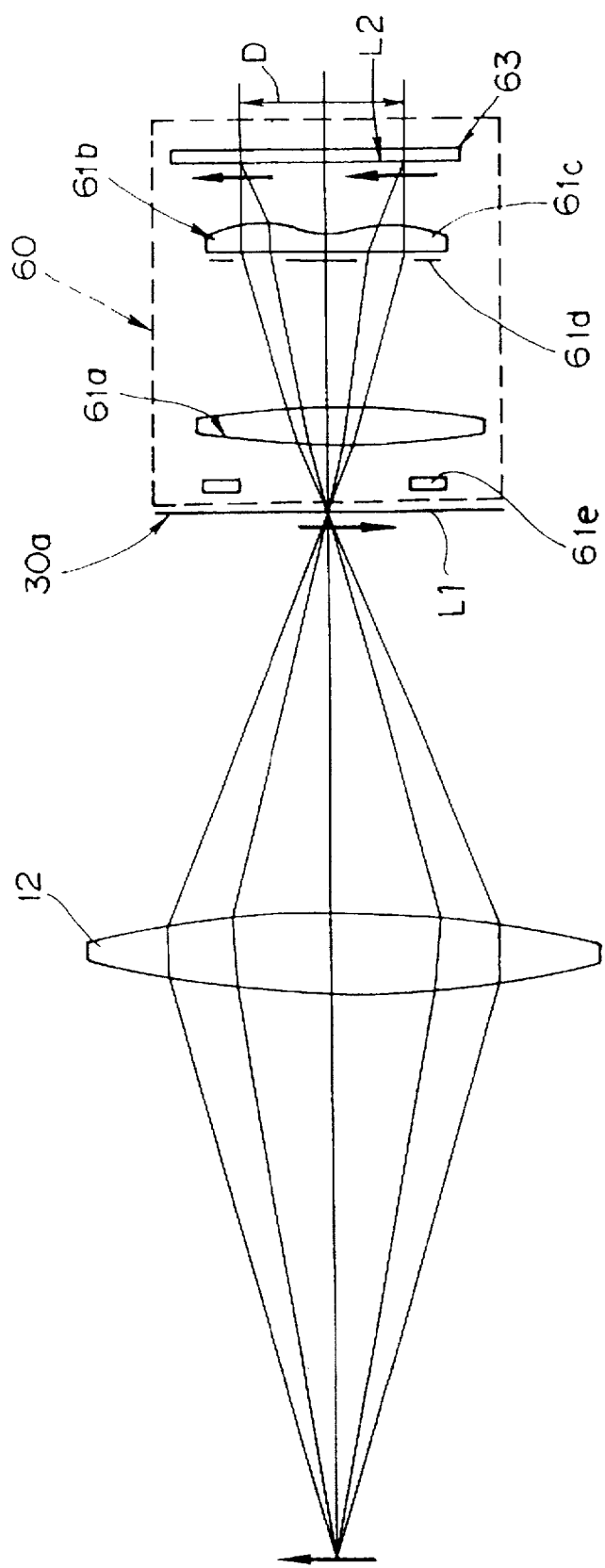

FIGS. 5 and 6 show a second embodiment of the present invention.

In the second embodiment, an AF optical system 60 in a color image pickup device using an electronic development type recording medium is provided behind the recording medium (recording unit 41). In the second embodiment, no movable reflector 21 is provided unlike the first embodiment, and consequently, the light transmitted through the photographing optical system 12 is directly made incident upon the optical color separation system 23. The structure of the optical color separation system 23 itself is the same as that of the first embodiment illustrated in FIGS. 1 and 2.

In the second embodiment, elements corresponding to those shown in the first embodiment are designated with like reference numerals, and thus no explanation therefor will be given.

In FIG. 6, the elements provided in front of the recording medium 41, such as the optical color separation system 23, are omitted. The view finder (not shown) is provided separate from the photographing optical system and can be, for example, an electronic view finder. Alternatively, if a long back focal distance is acceptable, a stationary half mirror can be used in place of the movable reflector 21 shown in FIG. 1.

The AF optical system 60 provided behind the recording unit 41 is comprised of a condenser lens 61a, a diaphragm mask 61d, a field mask 61e, and two separator lenses 61b and 61c. The condenser lens 61a and the two separator lenses 61b and 61c constitute an image reforming optical system. An AF sensor 63 is provided behind the separator lenses 61b and 61c. A detection element of the AF sensor 63 includes a line sensor in which a pair of images separated by the separator lenses 61b and 61c are compared. The line sensor comprises of a number of pixels spaced at a small pitch so as to accurately reproduce an image formed on a second image forming plane (surface) L2. On the second image forming plane L2, images, formed by the photographing optical system 12 on the (first) image forming plane L1, are re-formed by the condenser lens 61a and the separator lenses 61b and 61c.

In FIG. 6, the light transmitted through different portions of the photographing optical system 12 is split into two beams by the condenser lens 61a and the diaphragm mask 61d. The beams are made incident upon the AF sensor (line sensor) 63 through the separator lenses 61a and 61b, respectively. Assuming that the distance between the two images formed on the line sensor 63 in a focused state is D, the image distance is smaller and larger than D when the focused object images are formed at a position in front of the first image forming plane L1 and when the focused object images are formed at a position behind the first image forming plane L1, respectively. The image distance varies depending on the amount of defocus. Therefore, the control circuit calculates the amount and direction of defocus of the photographing optical system 12 in accordance with the detection signal of the image distance.

Consequently, in the illustrated embodiment, the light transmitted through the photographing optical system 12 is separated by the optical color separation system 23 and the separated colors (light components) are then made incident upon the respective recording areas 30a, 30b and 30c of the recording unit 41. Since the recording medium 30, including the recording area 30a, is light permeable and the AF optical system 60 is located behind the recording area 30a, the focus state of the photographing optical system 12 is detected by the AF optical system 60. Consequently, the AF operation, in which the focusing lens group of the photographing optical system 12 is moved to a focus position in accordance with the detection result, can be carried out. The recording operation of the images in the recording medium 30 is carried out through the recording medium drive circuit 50 by supplying the voltage to the recording medium 30 from the power source 33. The AF optical system 60 commences the operation in accordance with an operation start signal which is supplied, for example, when the release button 14 is depressed by half a step. The application of the voltage to the recording medium 30 is effected, for example, when the release button is fully depressed.

As can be understood from the above discussion, according to an aspect of the present invention, since the AF optical system 60 is provided behind the recording area 30a, it is not necessary to provide any member of the AF optical system 60 between the photographing optical system 12 and the electronic development type recording medium 30, thus resulting in a short back focal distance in comparison with the prior art. Moreover, a movable member, such as the movable reflector 21, is not necessary, leading to a realization of a compact camera. In addition, not only can the number of components be reduced but also operation speed can be increased.

Furthermore, the line sensor of which the AF sensor 63 is made is less expensive than an area sensor and contributes to a fast focusing operation.

Note that the electronic development type recording medium 30 is not limited to that of the illustrated embodiments, and can be of any type in which the image is electronically developed.

What is claimed is:

1. An electronic development type image pickup devices comprising:

a photographing optical system that forms an object image;

an optical color separation system that separates said object image formed by said photographing optical system into different color light components and converges said different color light components onto respective image forming surfaces;

an electronic development type recording medium having a plurality of recording areas provided on said respective image forming surfaces to electronically develop images formed thereon to thereby record said developed images as optical images;

a beam generator that outputs a plurality of beams of light to said optical color separation system; and a beam spot forming optical system for forming at least two marks on each recording area at different positions by making said beams of light generated by said beam generator incident upon said recording areas, said at least two marks on each recording area forming reference points to align said plurality of recording areas.

2. The electronic development type image pickup device according to claim 1, wherein said at least two marks are formed from said optical images formed on each recording area.

3. The electronic development type image pickup device according to claim 1, further comprising means for holding said electronic development type recording medium so that said recording areas lie in a same plane.

4. The electronic development type image pickup device according to claim 2, further comprising a reflector provided between said beam generator and said optical color separation system, said reflector making said beams of light emitted from said beam generator incident upon said optical color separation system, said reflector being movable to retract from an optical axis of said photographing optical system during a photographing operation.

5. The electronic development type image pickup device according to claim 4, wherein reflector is adapted to make said object image incident upon a view finder when said reflector makes the beams of light emitted from said beam generator incident upon said optical color separation system.

6. The electronic development type image pickup according to claim 1, wherein said beam spot forming optical system forms said at least two marks on each said recording area through said optical color separation system so that said beams for making said at least two marks on each recording area comprise a different color component.

7. An electronic development type image pickup device, comprising:

a photographing optical system that forms an object image on a first image forming plane;

an electronic development type recording medium provided at said first image forming plane to electronically develop said object image formed thereon, said electronic development type recording medium being light permeable;

an image reforming optical system that reforms said image formed on said electronic development type recording medium into a pair of images onto a second image forming plane; and an AF sensor provided at said second image forming plane to detect a focus state of said image formed on said electronic development type recording medium.

8. The electronic development type image pickup device according to claim 7, wherein said image reforming optical system and said AF sensor are provided behind said electronic development type recording medium.

9. The electronic development type image pickup device according to claim 7, wherein said image reforming optical system comprises a condenser lens and a pair of separator lenses.

10. The electronic development type image pickup device according to claim 7, further comprising an optical color separation system that separates said light emitted from said photographing optical system into different color light components and converges said different color light components onto said first image forming plane, wherein said electronic development type recording medium is provided with a plurality of recording areas located at said first image forming plane.

11. An electronic development type image pickup device, comprising:

a photographing optical system that forms an object image;

an optical color separation system that separates said object image formed by said photographing optical system into different color light components and converges said different color light components onto respective image forming surfaces;

an electronic development type recording medium having a plurality of recording areas provided on said respective image forming surfaces to electronically develop said images formed thereon to record said developed images as optical images; and a beam spot forming optical system for forming at least two marks on each of said recording area at different positions thereon before recording said images onto each recording areas, said at least two marks of each recording area forming reference points to align said plurality of recording areas.

12. An electronic development type image pickup device, comprising:

a photographing optical plane that forms an object image on an image forming plane;

an electronic development type recording medium provided at said image forming plane to electronically develop said image formed on said image forming plane, said electronic development type recording medium being light permeable; and an AF optical system provided behind said electronic development type recording medium to detect a focus state of said image formed on said recording medium using light which passes through said recording medium.

* * * * *

UNITED STATES PATENT AND TRADEMARK OFFICE
CERTIFICATE OF CORRECTION

PATENT NO. : 5,790,190

DATED : August 4, 1998

INVENTOR(S) : Makoto Mogamiya

It is certified that error appears in the above-identified patent and that said Letters Patent is hereby corrected as shown below:

Column 10, line 45, after "wherein" insert --said--.

Signed and Sealed this

Second Day of March, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO.   :   5,790,190
DATED        :   August 4, 1998
INVENTOR(S)  :   Makoto MOGAMIYA It is certified that error appears in the above-identified patent and that said Letters Patent is hereby corrected as shown below:

At column 10, line 6 (claim 1, line 1) of the printed patent, change "devices" to ---device,---.

Signed and Sealed this

Twenty-ninth Day of June, 1999

Attest:

Q. TODD DICKINSON

*Attesting Officer*     *Acting Commissioner of Patents and Trademarks*